(12) United States Patent
Garcia (10) Patent No.: US 10,792,764 B2
(45) Date of Patent: Oct. 6, 2020

(54) REINFORCED STRUCTURAL COMPONENTS

(71) Applicant: AUTOTECH ENGINEERING S.L., Amorebieta-Etxano (ES)

(72) Inventor: Michel Garcia, Sitges (ES)

(73) Assignee: AUTOTECH ENGINEERING S.L., Amorebieta-Etxano (ES)

( * ) Notice: Subject to any disclaimer, the term of this patent is extended or adjusted under 35 U.S.C. 154(b) by 785 days.

(21) Appl. No.: 15/321,150

(22) PCT Filed: Jul. 2, 2015

(86) PCT No.: PCT/EP2015/065096
§ 371 (c)(1),
(2) Date: Dec. 21, 2016

(87) PCT Pub. No.: WO2016/001360
PCT Pub. Date: Jan. 7, 2016

(65) Prior Publication Data
US 2017/0189996 A1    Jul. 6, 2017

(30) Foreign Application Priority Data
Jul. 3, 2014  (EP) ..................................... 14382256

(51) Int. Cl.
*B23K 26/34* (2014.01)
*B22F 3/105* (2006.01)
(Continued)

(52) U.S. Cl.
CPC ............ *B23K 26/34* (2013.01); *B22F 1/0003* (2013.01); *B22F 3/1055* (2013.01); *B22F 7/08* (2013.01);
(Continued)

(58) Field of Classification Search
CPC .............................. B23K 26/34; B23K 26/342
See application file for complete search history.

(56) References Cited

U.S. PATENT DOCUMENTS 4,390,377 A * 6/1983 Hogg ....................... C21D 8/06
148/518
5,418,350 A * 5/1995 Freneaux ................ B05B 7/228
219/121.64
(Continued)

FOREIGN PATENT DOCUMENTS

CN        1733414 A    2/2006
CN      102015194 A    4/2011
(Continued)

OTHER PUBLICATIONS

Machine translation of EP-1621439A1, Jun. 2019.*
(Continued)

*Primary Examiner* — Geoffrey S Evans
(74) *Attorney, Agent, or Firm* — Squire Patton Boggs (US) LLP (57) ABSTRACT

Methods for manufacturing reinforced structural components are described. The methods include providing a previously formed steel structural component having a thickness of 0.7 mm to 5 mm. In a reinforcement zone of the structural component, locally depositing a material on the structural component to create a local reinforcement with a minimum thickness of 0.2 mm, wherein locally depositing a material on the structural component includes supplying a metal powder to the reinforcement zone, and substantially simultaneously applying laser heat to melt the metal powder and create the reinforcement by drawing specific geometric shapes on the structural component with the metal powder and the laser heating. The disclosure further relates to a reinforced component obtained using such methods.

17 Claims, 5 Drawing Sheets

(51) Int. Cl.
B22F 7/08 (2006.01)
B23K 26/144 (2014.01)
B22F 1/00 (2006.01)
B23K 26/00 (2014.01)
B23K 101/34 (2006.01)
B23K 103/04 (2006.01)
B23K 101/00 (2006.01)

(52) U.S. Cl.
CPC ........ *B23K 26/0006* (2013.01); *B23K 26/144* (2015.10); *B22F 2301/35* (2013.01); *B23K 2101/006* (2018.08); *B23K 2101/34* (2018.08); *B23K 2103/05* (2018.08); *Y02P 10/295* (2015.11)

(56) References Cited

U.S. PATENT DOCUMENTS

| | | | | |
|---|---|---|---|---|
| 5,961,862 | A * | 10/1999 | Lewis | B23K 26/144 219/121.63 |
| 6,102,472 | A * | 8/2000 | Wallstrom | B62D 25/00 296/203.01 |
| 6,122,564 | A * | 9/2000 | Koch | B22F 3/1055 700/123 |
| 8,257,049 | B2 | 9/2012 | Yelistratov et al. | |
| 8,853,592 | B2 | 10/2014 | Straw et al. | |
| 2005/0056628 | A1 * | 3/2005 | Hu | B23K 26/144 219/121.84 |
| 2009/0057278 | A1 * | 3/2009 | Nowotny | B23K 26/123 219/121.63 |
| 2010/0180990 | A1 * | 7/2010 | Irander | B60J 5/0426 148/608 |
| 2011/0089151 | A1 * | 4/2011 | Miyagi | B23K 26/147 219/121.66 |
| 2014/0193659 | A1 * | 7/2014 | Lanzerath | B62D 25/20 428/600 |
| 2015/0375701 | A1 * | 12/2015 | Rottger | B60R 19/18 293/133 |

FOREIGN PATENT DOCUMENTS

| | | | | |
|---|---|---|---|---|
| CN | 102149509 | A | 8/2011 | |
| DE | 10 2011 086813 | A1 | 5/2013 | |
| DE | 10 2013 219250 | A1 | 3/2014 | |
| DE | 20 2013 010638 | U1 | 5/2014 | |
| EP | 1621439 | A1 * | 2/2006 | ........... B61D 17/08 |
| JP | H0230396 | A | 1/1990 | |
| JP | H 04210886 | A | 7/1992 | |
| JP | H 0751872 | A | 2/1995 | |
| JP | 2004/276031 | A | 10/2004 | |
| JP | 2011/025900 | A | 2/2011 | |
| JP | 2014/076483 | A | 5/2014 | |

OTHER PUBLICATIONS

International Search Report and Written Opinion of the International Searching Authority dated Sep. 2, 2015 for PCT/EP2015/065096, 11 pages.
"Steels for hot stamping—Usibor" Jan. 28, 2014, ArcelorMittal, 9 pages.
Notice of Reasons for Rejection dated May 21, 2019 for Japanese Patent Application No. JP2016-575930, English translation, 6 pages.
Communication pursuant to Article 94(3) EPC dated May 31, 2019 for European Patent Application No. 15732001.1, 9 pages.
Schneider: "Laser Cladding With Powder, effect of some machining parameters on clad properties", PhD thesis University of Twente, Enschede, The Netherlands, Mar. 1998, 177 pages.
Notice of Reasons for Rejection dated Dec. 24, 2019 for Japanese Patent Application No. 2016-575930, English translation, 5 pages.

* cited by examiner

REINFORCED STRUCTURAL COMPONENTS

This application claims the benefit of European Patent Application EP14382256.7 filed on Jul. 3, 2014.

The present disclosure relates to methods for manufacturing reinforced structural components and to the structural components obtained through these methods.

BACKGROUND

The demand for weight reduction in e.g. the automotive industry has led to the development and implementation of lightweight materials, manufacturing processes and tools. The growing concern for occupant safety also has led to the adoption of materials which improve the integrity of the vehicle during a crash while also improving the energy absorption. In that sense, vehicle parts made of high-strength and ultra-high-strength steel (UHSS) are often employed in order to satisfy criteria for lightweight construction.

Typical vehicle components that need to meet weight goals and safety requirements include structural and/or safety elements such as door beams, bumper beams, cross/side members, A/B pillar reinforcements, and waist rail reinforcements.

For example, a process known as Hot Forming Die Quenching (HFDQ) uses boron steel sheets to create stamped components with Ultra High Strength Steel (UHSS) properties, with tensile strengths up to 1,500 MPa. The increase in strength allows for a thinner gauge material to be used, which results in a weight savings over conventionally cold stamped mild steel components.

Simulations performed during the design phase of a typical vehicle component can identify points or zones of the formed component that need reinforcement (because lighter and thinner metal sheets and blanks are used) in order to increase strength and/or stiffness. Alternatively a redesign may be done in order to steer deformations.

In that sense, there are several procedures with which some areas of a previously formed component can be reinforced or softened in order to redistribute stress and save weight by reducing the thickness of the component. These known procedures for reinforcing a component are, for example, procedures adding welded reinforcements prior to any forming process. Such reinforcements may be "patchworks" in which partial or complete overlapping of several blanks may be used, or blanks or plates of different thickness that may be welded "edge to edge", i.e. Tailor welded blanks (TWB). Structural mechanical requirements can thus be achieved theoretically with a minimum of material and thickness (weight).

In some of these methods however, further manufacturing processes are involved. For example, when ultra-high strength steels are being hot formed some weldability problems may arise due to an aluminum-silicon (AlSi) coating usually used to protect from corrosion and oxidation damage. In order to overcome these problems it is known to remove a part of the coating in an area close to the welding gap by laser ablation. However, this represents an additional step in the manufacturing process of a vehicle component.

Furthermore, when welded reinforcements (patchworks) are added to a blank, partial or complete overlapping of blanks occur. These areas are potential corrosion starting points as overlapped regions remain underneath and do not receive e.g. a corrosion coating.

In addition, depending on the component being formed there may be regions in which it is not possible or it is at least cumbersome to use welded reinforcements e.g. corners or areas with elevation changes. Patchworks are normally welded using a spot welding which requires a minimum space to distribute the spots. Additionally, patchworks need a minimum size in order to be easily welded. This may involve an extra weight as the reinforcement needs to have a minimum size in order to be welded rather than having the right size (minimum) needed to reinforce the required area.

The aforementioned problems and/or challenges are not unique to the automotive industry or to the materials and processes used in that industry. Instead these challenges may be encountered in any industry wherein weight reduction is an objective. When weight reduction is an objective, the components become ever thinner which can thus lead to an increased need for reinforcements.

It is an object of the present disclosure to provide improved methods of manufacturing reinforced structural components.

SUMMARY

In a first aspect, a method for manufacturing reinforced structural components is provided. The method comprises providing a previously formed steel structural component having a thickness of 0.7 mm to 5 mm. The method further comprises in a reinforcement zone of the component, locally depositing a material on the structural component to create a local reinforcement having a minimum thickness of 0.2 mm, wherein locally depositing a material on the structural component comprises supplying a metal powder to the reinforcement zone and substantially simultaneously applying laser heat to melt the metal powder and create the reinforcement by drawing specific geometric shapes on the structural component with the metal powder and the laser heating.

According to this aspect, a kind of weld cladding process is carried out in a previously formed steel component to create e.g. ribs or reinforcements on the component. The ribs or reinforcements can provide stiffness in specific areas (points or zones needing reinforcement) of the component. The steel component is substantially thin, i.e. with a thickness between 0.7 mm to 5 mm and the local reinforcement has a minimum thickness of 0.2 mm. This way, the reinforcement represents approximately a 30% of the local thickness of the component, when components of 0.7 mm are used. In some cases, the thin blanks may be in relatively simple deformation processes e.g. hot stamped or hot formed in a press, formed in roll forming, etc. Using the process described herein, i.e. supplying a metal powder while substantially simultaneously applying laser heat the thickness of the structural component can be maintained thin but its strength or structural properties in specific areas is increased. The weight of the final component can thus be minimized. The zones that need reinforcement can thus be strengthened and/or deformations can be redirected. By using localized weld cladding, the volume and thickness of the final steel component is optimized thus reducing its weight. Widely varying reinforcements can be "written" or drawn" onto an already formed blank.

Contrary to previously known weld cladding processes, which are used for e.g. anti-corrosion, material is deposited only locally and to such an extent, that the stiffness and/or strength of the component is substantially affected.

Additionally, the use of laser heat with powder supply allows the formation of very specific and precise geometries, i.e. reinforcements can be tailor-made, having a wide variety of shapes or designs such as circles around holes, straight lines intersecting each other to form a grid, intermittent or broken lines and large or small figures among others. Mechanical properties of the reinforcements created may thus depend on the geometry drawn with the powder and the laser heating process (weld cladding).

The method is thus quite versatile and substantially any desired geometry can be achieved. Complicated geometries such as corners or areas with elevation changes can also be reinforced. Localized strength enhancement is thus achieved i.e. reinforcement having specific and precise geometries which optimizes (reduces) the weight of the final reinforced component. Inventors have found that the use of weld cladding for creating local reinforcement in a formed component leads to particularly good results in formed components having a thickness of approximately 0.7 mm to approximately 5 mm.

In some examples the local reinforcement may have a thickness of 0.2 mm-10 mm. The local reinforcement thickness ensures the provision of increased mechanical strength of the component in the reinforcement zone. In further examples, the thickness of the reinforcement (i.e. the increase of the thickness with respect to the component) may be from 0.2 to 6 mm, and in particular from 0.2 to 2 mm. In these examples, a thickness ratio between the local reinforcement and the formed component (thickness of local reinforcement/thickness of steel structural component) may range at least from approximately 4% to approximately 1400%. Inventors have found that the use of thickness ratios between the reinforcement and the final component of approximately 20% to approximately 300% lead to particularly improved structural performance without increasing the weight too much. In particular thickness ratios of approximately 50% to approximately 300% lead to especially high strength and stiff components with a substantially low weight increase.

In some examples, the reinforcement zone of the component and/or the specific geometric shapes may be previously defined from crash simulations of the components. This way the specific geometric shapes are created as a function of the deformation energy involved in the crash. In some examples, the thickness of the reinforcement zone or the specific geometric shapes may further depend on the thickness of the blank used to form the component. In further examples, the reinforcement zone may be defined to compensate a loss of strength caused by holes needed e.g. for screws. In these cases the reinforcement zone may surround the holes provided in the component. In more examples, the reinforcement zone may be defined at those areas in which a hinge or a hook (e.g. tow hook of a bumper) is provided.

In some examples, the whole structural component may have substantially the same thickness. In further examples, the structural component may be made from tailor blanks or patchwork blanks, i.e. it may have different thickness along its longitude.

In some examples, the metal powder may be a stainless steel based powder, e.g., stainless steel AlSi 316L or a composition corresponding to an Ultra High Strength Steel, such as e.g. Usibor®. In some examples, powders may be used that have a similar composition as that of the material of the blank or component on which the reinforcements are to be provided. This way, the powder used has substantially similar properties to those of the steel structural component thus resulting, i.e. once melted, in a substantially homogeneous final reinforced product.

In a further aspect, the present disclosure provides reinforced components as obtained by or obtainable by any of the methods substantially as hereinbefore described.

Examples of the present disclosure may be used in components that have been formed in a variety of ways, including e.g. hot stamping, roll forming, and hydroforming. Examples of the present disclosure may be used in components of different materials, and in particular different steels.

BRIEF DESCRIPTION OF THE DRAWINGS

Non-limiting examples of the present disclosure will be described in the following with reference to the appended drawings, in which.

DETAILED DESCRIPTION OF EXAMPLES

Figure 1A:
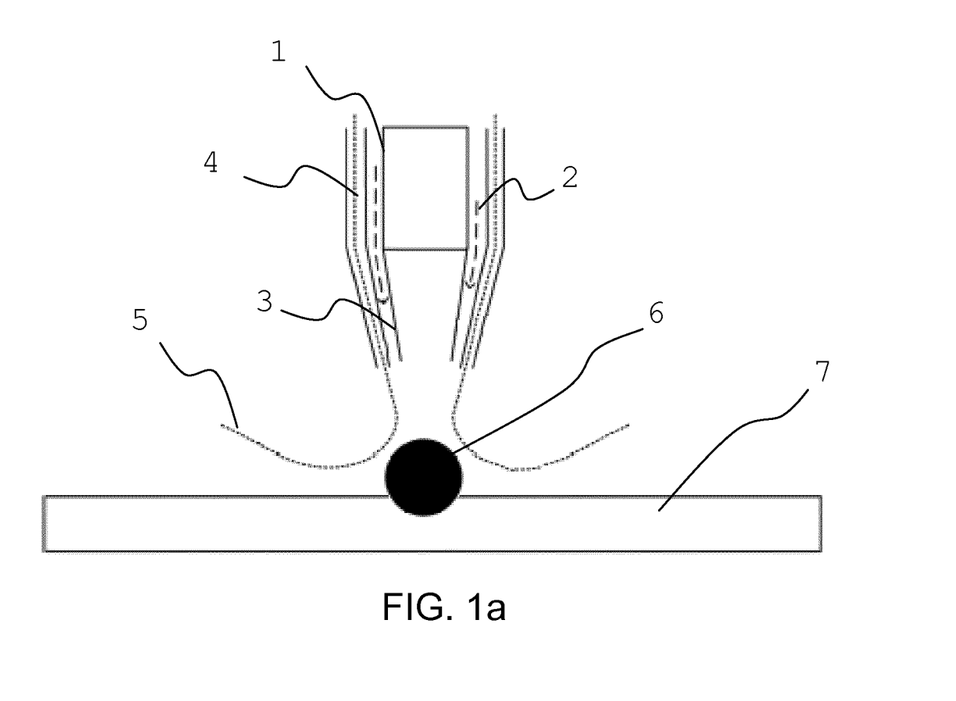
FIGS. 1a and 1b schematically show examples of applying powder and laser welding.

FIG. 1a shows an example of applying a reinforcement 6 at the surface of formed component 7, for example a hot formed component. In alternative examples, other ways of forming the component may also be foreseen such as cold forming, hydroforming or roll forming.

In this example, a laser welder 1 is schematically shown. The laser welder 1 may have a laser head 3 from which a laser beam exits. A gas powder flow 2 indicated with an interrupted line with arrow is also schematically shown. The gas powder flow 2 may be fed in a coaxial manner with respect to the laser beam towards the zone on which the reinforcement 6 is to be formed. The gas powder flow 2 may thus be fed to the zone on which the reinforcement 6 is to be formed while the laser beam is being applied.

In these examples, a gas powder head may be coaxially arranged with respect to the laser head 3 and both heads may be arranged such that the gas powder flow and the laser beam may be substantially perpendicular to a surface of the component on which the reinforcement 6 is to be formed.

In alternative examples, the gas powder flow may be fed at an angle with respect to the component. In some of these examples, the gas powder flow may also be fed at an angle with respect to the laser beam or it may be coaxially arranged with respect to the laser beam as in the previous example.

In further figures the same reference signs have been used to designate matching elements.

Figure 1B:
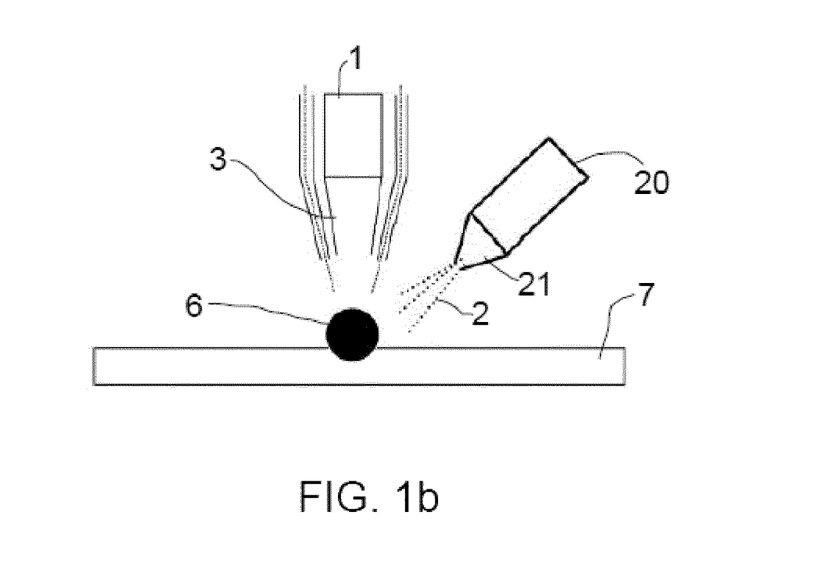

FIG. 1b shows an example in which the powder supply 20 with nozzle 21 may be provided at an angle with respect to the laser head 3. In these cases, the powder flow 2 may be fed at an angle with respect to the laser beam exiting from the head 3 of the laser welder 1.

In some examples, argon may be used as a transportation gas, depending on the specific implementation. Other examples of transportation gas may also be foreseen, e.g. nitrogen or helium.

In some examples (see FIGS. 1a and 1b), a shield gas channel 4 may also be provided. In these cases, the shield gas channel 4 may be coaxially provided with respect to the laser beam to supply a shield gas flow 5 around the zone on which the reinforcement 6 is to be formed. In some examples, helium or a helium based gas may be used as a shielding gas. Alternatively an argon based gas may be used.

The flow rate of the shielding gas may e.g. be varied from 1 liter/min to 15 liters/min. In further examples, no shielding gas may be required.

The laser may have a power sufficient to melt at least an outer surface (or only an outer surface) of the component and thoroughly mixed/joined the powder throughout the entire zone on which the reinforcement 6 is to be formed.

In some examples, welding may comprise welding using a laser having a power of between 2 kW and 16 kW, optionally between 2 and 10 kW. The power of the laser should be enough to melt at least an outer surface of a formed component having a typical thickness i.e. in the range of 0.7-5 mm. By increasing the power of the welder the welding velocity may be increased.

Optionally, a Nd-YAG (Neodymium-doped yttrium aluminum garnet) laser may be used. These lasers are commercially available, and constitute a proven technology. This type of laser may also have sufficient power to melt an outer surface of a formed component and allows varying the width of the focal point of the laser and thus of the reinforcement zone. Reducing the size of the "spot" increases the energy density, whereas increasing the size of the spot enables speeding up the welding process. The weld spot may be very effectively controlled and various types of welding are possible with this type of laser.

In alternative examples, a $CO_2$ laser with sufficient power may be used. In further examples, twin spot welding may also be used.

The powder fed to the reinforcement zone may be stainless steel Alsi 316L, as commercially available from e.g. Hoganäs. The powder has the following composition in weight percentages: 0%-0.03% carbon, 2.0-3.0% of molybdenum, 10%-14% of nickel, 1.0-2.0% of manganese, 16-18% chromium, 0.0-1.0% of silicon, and the rest iron and unavoidable impurities. It was found that the presence of nickel in this composition led to good corrosion resistance. The addition of chromium and silicon aids in corrosion resistance, and molybdenum aids in increasing the hardness. In alternative examples other stainless steels may also be used even UHSS. In some examples, the powder may incorporate any component providing higher or lower mechanical characteristics depending on circumstances.

FIGS. 2a-2d show different examples of specific reinforcement geometries that may be obtained with methods substantially as hereinbefore described. As mentioned above, laser welding with powder supply may allow the formation of almost any desired geometry having e.g. different curvature, different size (length, width and height) or even crossing lines defining a grid. These methods are quite versatile. No extra material in a zone that does not need reinforcement is provided, and the final weight of the component may thus be optimized.

Figure 2A:
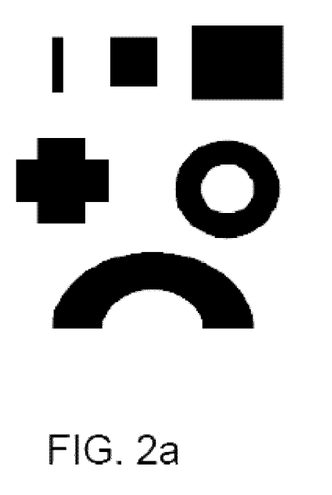
FIGS. 2a -2d show examples of different specific reinforcement geometries that may be obtained by a method substantially as hereinbefore described.
Figure 2B:
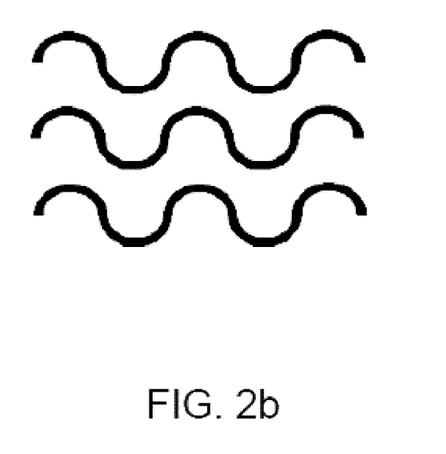
Figure 2C:
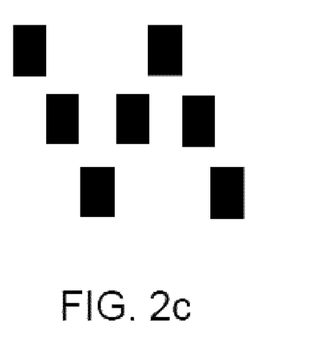

For example, FIGS. 2a and 2c show different discrete known shapes such as rectangles, squares, annular rings, half a ring and a cross among other possibilities.

Figure 2D:
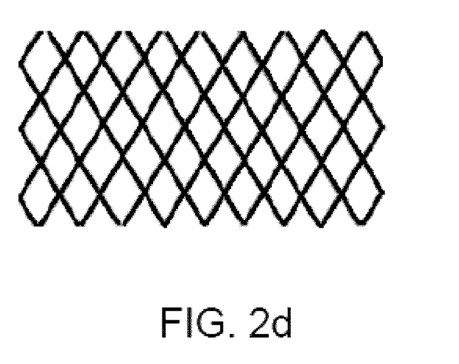

FIG. 2b shows curved lines defining each a substantially sinusoidal form and FIG. 2d shows straight lines crossing each other to define a grid.

The Inventors have found that local reinforcements having a minimum thickness of 0.2 mm lead to good results while optimizing the weight of the final reinforced steel component. The minimum thickness may be obtained with only one powder deposition. Furthermore, each laser exposure and powder deposition may involve a maximum thickness of approximate 1 mm. In some examples, the local reinforcement may have a thickness between approximately 0.2 mm and approximately 6 mm. This may be achieved with repetitive depositions of powder.

And in more examples, the local reinforcement may have a thickness between approximately 0.2 mm and approximately 2 mm. In all these examples, the width of the local reinforcement with each powder deposition and laser exposure may generally be between approximately 1 mm to approximately 10 mm.

Figure 3A:
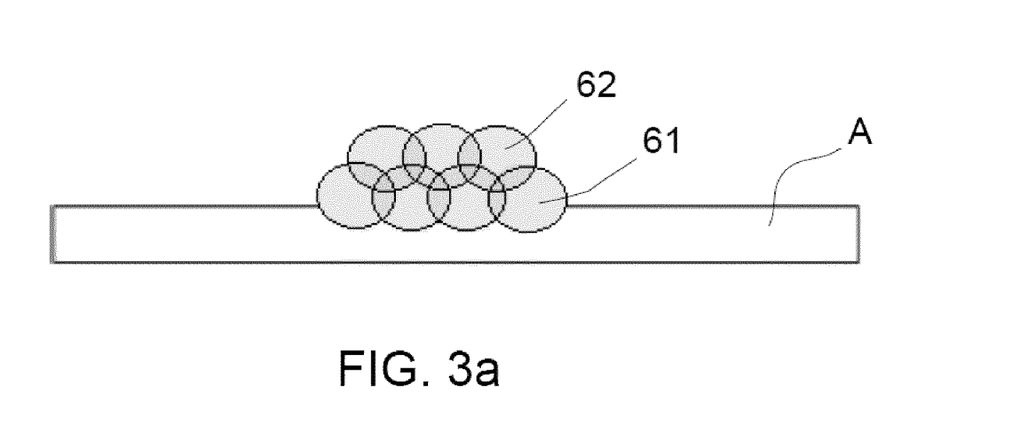
FIGS. 3a and 3b show an alternative method for manufacturing reinforced structural components.
Figure 3B:
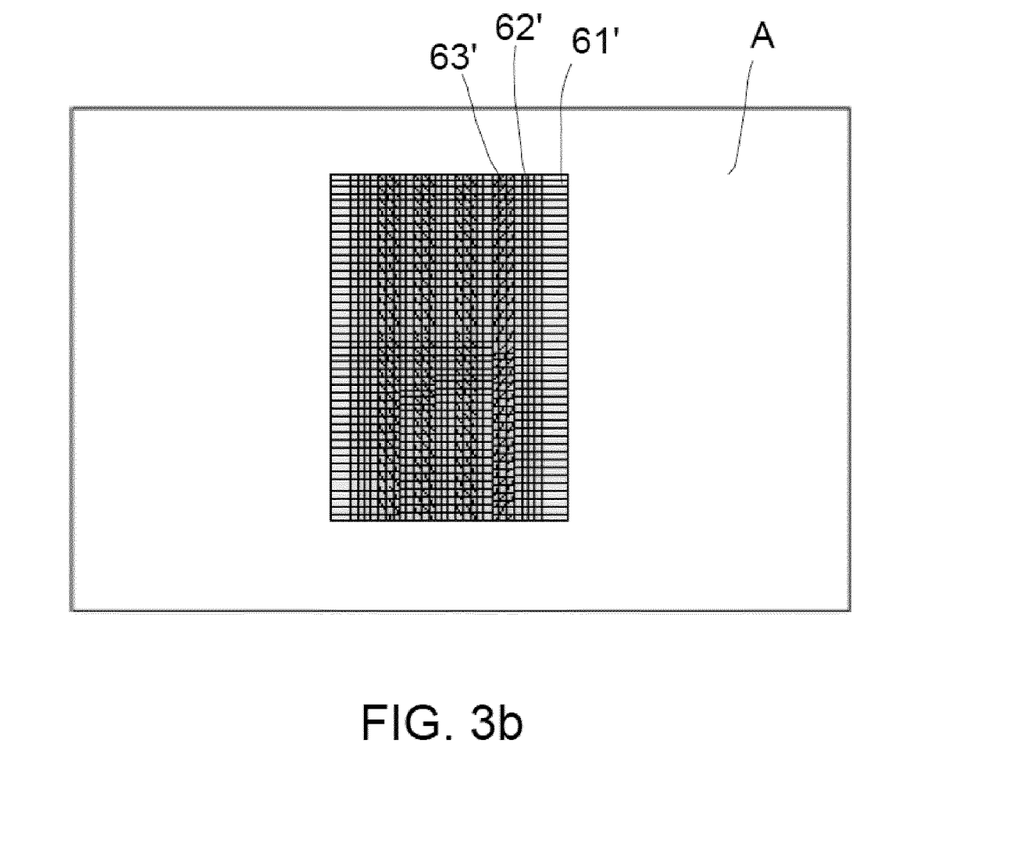

FIGS. 3a and 3b show that in some examples, the method may further comprise repeating locally depositing a material in a reinforcement zone of the structural component. By doing this the thickness and/or width of the reinforcement may be increased. In these examples the powder used for each deposition may be the same or, depending on circumstances, it may be different. The example of FIG. 3a shows a side view of an example in which two different laser exposures with metal powder applications 61 and 62 have been carried out. The example of FIG. 3b shows a top view of an example in which three different laser exposures with metal powder depositions 61', 62' and 63' have been carried out.

Figure 4A:
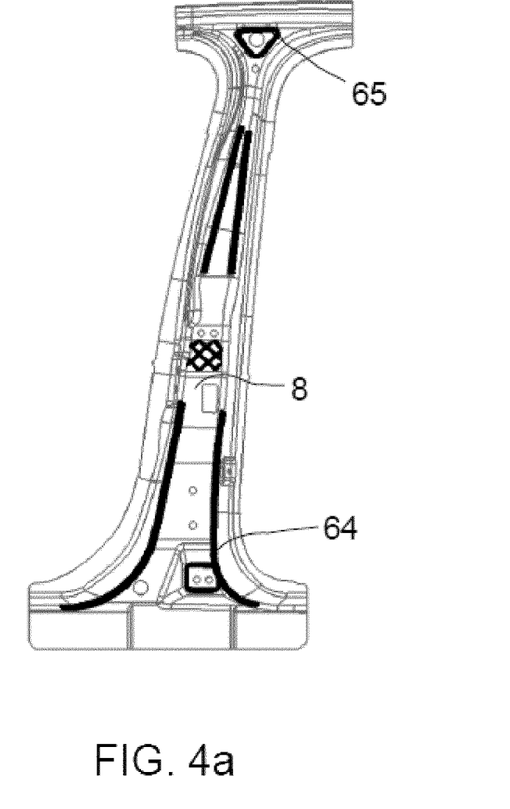
FIGS. 4a and 4b show each an example of a reinforced component manufactured by any method substantially as hereinbefore described.
Figure 4B:
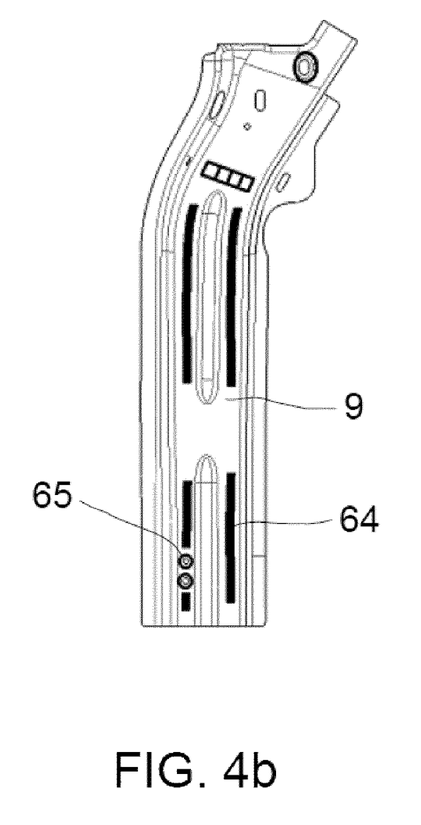

FIGS. 4a and 4b show different reinforced components obtained by any method substantially as hereinbefore described. In the example of FIG. 4a a B pillar 8 is schematically illustrated. In the example of FIG. 4b a bar 9 e.g. a cross/side member is schematically illustrated. Both components 8 and 9 may be formed e.g. by HFDQ process. In alternative examples, other ways of forming the component may also be foreseen such as cold forming, hydroforming or roll forming. Reinforcements 64 and 65 may be added by weld cladding, i.e. by supplying a metal powder while applying laser welding. Reinforcements 64 and 65 are designed e.g. to direct tensions and increase stiffness (rigidity) of the component. E.g. reinforcements 64 may be applied in order to improve strength in case of an impact in areas such as corners, end portions and reinforcements 65 may be applied in order to add strength to the component due to e.g. a hole made during manufacture so that the whole strength of the component is not affected by the presence of the hole. In general in a component, reinforcements may be required in those areas that need to withstand most loads, e.g. in a B pillar these areas are the corners.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for manufacturing reinforced structural components, the method comprising:
   providing a previously formed boron steel structural component made by hot forming die quenching of a boron steel blank, wherein the previously formed component has a thickness of 0.7 mm to 5 mm,
   in a reinforcement zone of the previously formed boron steel structural component, locally depositing a material on the previously formed boron steel structural component to create a local reinforcement having a minimum thickness of 0.2 mm, wherein
   the locally depositing a material on the previously formed boron steel structural component comprises
      supplying a metal powder to the reinforcement zone, and
      simultaneously applying laser heat to melt the metal powder and create the local reinforcement by drawing specific geometric shapes on the previously formed boron steel structural component with the metal powder and the laser heating.

2. The method according to claim 1, wherein the local reinforcement has a thickness from 0.2 mm to 10 mm.

3. The method according to claim 2, wherein a thickness ratio between the local reinforcement and the previously formed boron steel structural component is from 50% to 300%.

4. The method according to claim 1, wherein the whole of the previously formed boron steel structural component has the same thickness.

5. The method according to claim 1, wherein the metal powder is a stainless steel based powder.

6. The method according to claim 1, wherein the supplying a metal powder to the reinforcement zone comprises feeding a gas-powder flow to the reinforcement zone.

7. The method according to claim 6, wherein the feeding a gas-powder flow to the reinforcement zone comprises feeding the gas-flow coaxially using a gas powder head coaxially arranged with respect to a laser head.

8. The method according to claim 6, wherein the feeding a gas-powder flow to the reinforcement zone comprises feeding the gas-flow at an angle between 15° and 60°.

9. The method according to claim 6, wherein the feeding a gas-powder flow to the reinforcement zone comprises feeding the gas-flow at an angle between 30° and 45° with respect to the previously formed boron steel structural component.

10. The method according to claim 1, wherein the applying laser heat comprises projecting a laser beam onto the previously formed boron steel structural component and providing relative movement between the laser beam and the previously formed boron steel structural component so as to deposit the specific geometric shapes together with the metal powder.

11. The method according to claim 1, wherein the applying laser heat comprises using a laser with a power of between 3 kW and 16 kW.

12. The method according to claim 1, wherein the previously formed boron steel structural component is made from a tailor blank or from a patchwork blank.

13. The method according to claim 1, further comprising repeating locally supplying a metal powder to the reinforcement zone, and simultaneously applying laser heat to the reinforcement zone.

14. The method according to claim 1, wherein the applying laser heat comprises using a laser with a power of between 4 kW and 10 kW.

15. The method according to claim 1, wherein the metal powder has a composition that is the same as a composition of the boron steel blank.

16. A method for manufacturing reinforced structural components, the method comprising:
providing a previously formed steel structural component of constant thickness, wherein the previously formed steel structural component is made by hot forming die quenching of a boron steel sheet of constant thickness between 0.7 and 5 mm,
in a reinforcement zone of the previously formed steel structural component, locally depositing a material on the previously formed steel structural component to create a local reinforcement having a minimum thickness of 0.2 mm, wherein
the locally depositing a material on the previously formed steel structural component comprises
supplying a metal powder to the reinforcement zone, and
simultaneously applying laser heat to melt the metal powder and create the local reinforcement by depositing specific geometric shapes on the previously formed steel structural component with the metal powder and the laser heating, wherein the local reinforcement has a thickness from 0.2 mm to 10 mm and a thickness ratio between the local reinforcement and the previously formed steel structural component is from 50% to 300%.

17. The method according to claim 16, wherein the metal powder is a stainless steel powder.

* * * * *